July 2, 1963    J. T. ZIMMER    3,096,514
MOVING TARGET INDICATOR SYSTEMS
Filed Dec. 26, 1958
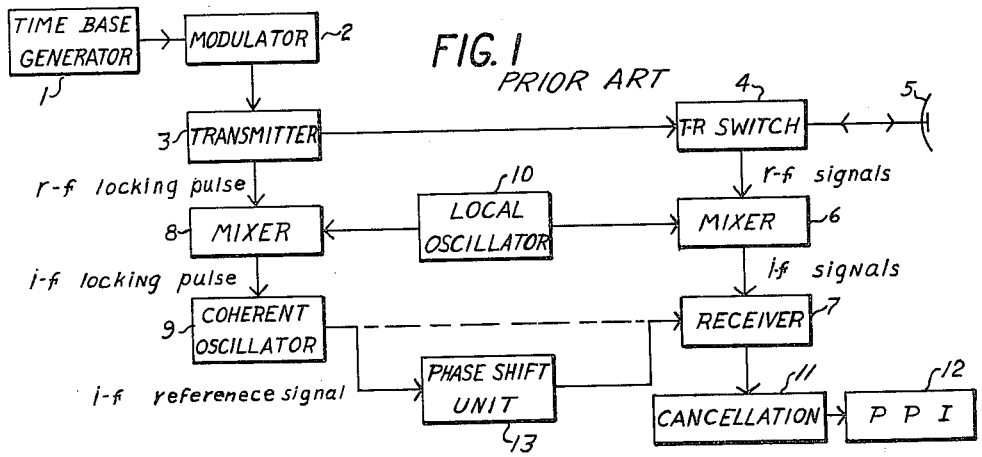
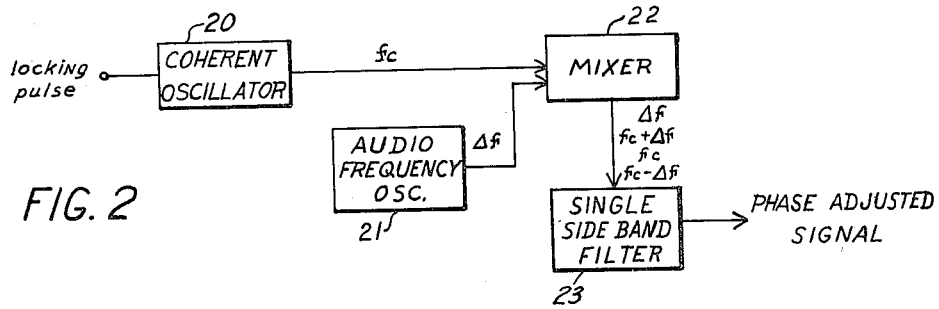
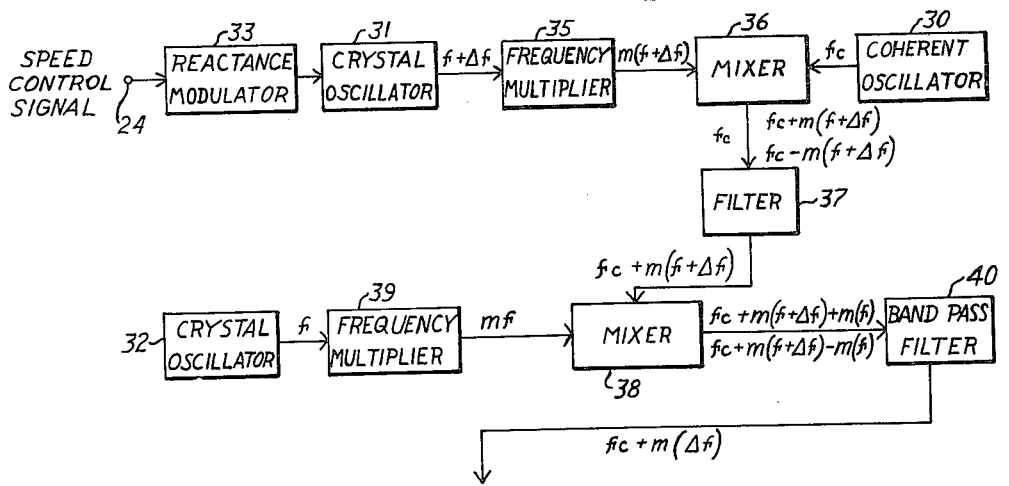
INVENTOR
JOHN T. ZIMMER
BY /V. Vincent Harsha
ATTORNEY United States Patent Office 3,096,514
Patented July 2, 1963

3,096,514
MOVING TARGET INDICATOR SYSTEMS
John T. Zimmer, Holliston, Mass., assignor to Raytheon Company, Lexington, Mass., a corporation of Delaware
Filed Dec. 26, 1958, Ser. No. 783,652
6 Claims. (Cl. 343—7.7)

This invention relates to a radio object-locating system and more particularly pertains to a radar system of the type making use of the Doppler effect for measuring the velocity of a moving target and which indicates those objects which are in motion to the exclusion of stationary objects. The objective of a moving target indicating (MTI) system is to present signals received by a pulsed radar set in such a way that moving targets are shown while stationary objects do not cause a response. The common method of presenting this information is on a plan position indicator (PPI) and the system is arranged to prevent stationary objects from cluttering the indicator. Where the radar set is in a fixed location, the problem of nullifying echoes from stationary objects readily yields to a solution. The problem of indicating moving targets is somewhat more difficult where the radar set is carried on a moving ship or is airborne because stationary objects are then moving relative to the radar set and the clear distinction between moving and stationary targets, which obtains when the set is in a fixed location, is lost. For example, where the radar set is mounted in a ship moving at a velocity of 20 knots in a northerly direction, all targets moving in the same direction at 20 knots appear to be stationary to the radar receiver, while the land and all fixed objects appear to be moving. In spite of this, it is possible to arrange moving target indicating systems to compensate for the motion of the seaborne or airborne vehicle carrying the radar set so that only targets in motion are displayed.

The invention relates to apparatus for compensating a a moving vehicle carrying the system. It is well known moving target indicating radar system for motion due to a moving vehicle carrying the system. It is well known that a moving target indicating radar system differentiates between fixed and moving targets by detecting the change in frequency or phase of the reflected wave caused by the Doppler effect. In the invention, a Doppler frequency, representing the apparent Doppler frequency of a fixed target, is developed as the difference in frequency between two stable low frequency oscillators, one of the oscillators being frequency modulated by a reactance tube in response to own ship's speed control signals. The Doppler or difference frequency is obtained by causing the output of each of the low frequency oscillators to be raised to radio frequency by means of frequency multiplication. The radio frequency signals derived from the modulated low frequency oscillator are heterodyned with the output of a coherent oscillator and the resultant sum frequency is obtained by filtering. The phrase "coherent oscillator" means an oscillator whose output is phase coherent with an input to said oscillator. The resultant sum frequency is then heterodyned with the radio frequency signals derived from the unmodulated low frequency oscillator and the resultant difference frequency is obtained by filtering. That difference frequency contains a component of signal which adjusts for own ship's speed.

The organization of the invention, its manner of operation, and the advantages inhering in the invention will become apparent from the following detailed description when considered in conjunction with the accompanying drawings in which:

FIG. 1 is a schematic representation of a practical moving target indicating system of a well-known type;

FIG. 2 is a schematic showing of an impractical phase-adjusted coherent oscillator; and FIG. 3 is a schematic representation of the arrangement of the invention.

In order to acquaint the reader with the purpose of the present invention and the manner in which the invention eliminates certain difficulties now associated with moving target indicating systems, a brief description of a typical system is required. For a more comprehensive discussion of moving target indicating systems the reader is referred to chapter 16, volume 1, of the Radiation Laboratory Series, first edition, published by McGraw-Hill.

Referring to FIG. 1, there is shown in block schematic form a practical moving target indicating system. In the pulsed type radar systems with which this invention deals, a cycle of operation is begun by the initiation of a trigger signal in the time base generator 1 which causes the modulator 2 to fire and send a high-power, high-voltage pulse to the transmitter 3, which usually employs a magnetron tube. For the duration of the modulator pulse, the magnetron or other high frequency generating tube oscillates at the radio frequency for which it is designed. The radio frequency pulse thus generated passes through a transmit-receive (T–R) switch 4 to the antenna 5 where the radio frequency pulse is radiated into space. The transmit-receive switch 4, during the transmission time, disconnects the mixer 6 from the transmitter to prevent the receiver 7 from being damaged by the high power transmitted energy. Between transmitted pulses the transmit-receive switch disconnects the transmitter and connects the antenna to the mixer 6 so that received radio echoes are fed into that mixer. Part of the radio frequency energy from the transmitter is diverted into mixer 8 and is used as a locking pulse to lock the coherent oscillator 9. This is necessary because the transmitter 3 starts with random phase from pulse to pulse and the phase of the coherent oscillator 9 must be matched to that of the transmitter at each transmitted pulse. A stable local oscillator 10 provides a signal to the two mixers, the mixer 8 being employed to reduce the frequency of the locking pulse, and the mixer 6 being employed to reduce the frequency of the radio frequency signals. This mixing of signals is merely a utilization of the well-known superheterodyne principle to obtain intermediate frequency (I-F) signals. The I-F locking pulse from mixer 8 is applied to the oscillator 9 which is thereby rendered coherent in phase with the transmitter. Where the radar set is in a fixed location, the phase of I-F echo signals from a stationary target depends on the starting phase of the transmitter, the starting phase of the local oscillator and the range to the target, the latter determining the number of cycles executed by the local oscillator while the transmitted pulse travels to the target and back. The I-F reference signal provided by the coherent oscillator has a phase that depends on the starting phase of the transmitter, the starting phase of the local oscillator, and the range to the target, the range determining the number of cycles executed by the coherent oscillator while the transmitted pulse travels to the target and back. If the radar set is fixed in location, the I-F reference signal from the coherent oscillator is fed directly to the receiver where it is heterodyned with the I-F echo signals from mixer 6. In this circumstance the starting phases of the transmitter and local oscillator are cancelled by the heterodyning action so that the phase of the receiver output depends only on the number of cycles executed by the local oscillator 10 and the coherent oscillator 9. Both of these oscillators are stable and consequently the beat signal from a stationary target has a steady amplitude from pulse to pulse. When a target is moving, however, its range will change from pulse to pulse and a fluctuating output signal results from the corresponding changes in the phases traversed by the oscillators during the echo-time (the time for a pulse to travel from the antenna to the target and back). The output from receiver 7 is coupled into a cancellation device 11 which cancels those signals having a constant amplitude from pulse to pulse and the remaining signals are then displayed on a plan position indicator (PPI) 12.

Where the moving target indicating system is carried aboard ship or is airborne, some mechanism must be introduced to compensate for the velocity of the vehicle. For moving target indicating systems in motion, echo signals from stationary targets do not have the same phase relative to the transmitter pulse in successive pulse repetition periods. It is necessary, therefore, to adjust the phase of the coherent oscillator I-F reference signal so that signals from stationary targets have the same phase relative to coherent oscillator phase in successive pulse repetition periods. To accomplish this, a phase shift unit 13 is interposed between the coherent oscillator 9 and the receiver 7 to change the phase of the I-F reference signals at the same rate as that at which the phase of echoes from a stationary target is changed by the motion of the ship or other vehicle. The effect of the phase shift unit is to give the radar set a virtual velocity which cancels the actual velocity of the vehicle. Such a phase adjusted coherent oscillator is known as a "moving coho" to those familiar with moving target indicating systems.

One type of phase adjusted coherent oscillator is shown in FIG. 2 and is here discussed solely to illustrate the problems involved. In FIG. 2 the coherent oscillator 20 can be assumed to be analogous to the oscillator 9 of FIG. 1 and the output $f_c$ of the oscillator 20 is assumed to have a frequency of 30 megacycles, an I-F frequency commonly used in such systems. It is further assumed that the moving target indicating system is carried aboard a moving ship so that radio echoes from a stationary target, due to the Doppler effect, are shifted in frequency by an amount $\Delta f$ equal to 1 kilocycle. An audio frequency oscillator 21 supplies a signal whose frequency is $\Delta f$ to a mixer 22 where it is heterodyned with the output $f_c$ of coherent oscillator 20. The output of mixer 22 consists of the sum and difference frequencies, $f_c+\Delta f$, $f_c-\Delta f$, and the two original frequencies $f_c$ and $\Delta f$. The sum frequency $f_c+\Delta f$ is equal to 30,001 kilocycles, the difference frequency is equal to 29,999 kilocycles, $f_c$ is 30,000 kilocycles, and $\Delta f$ is 1 kilocycle. The signal that we would like to obtain is the upper sideband, that is, the sum frequency $f_c+\Delta f$. However, it is obvious that $f_c+\Delta f$, $f_c-\Delta f$, and $f_c$ lie so close together in frequency that it is not practicable to obtain the desired signal $f_c+\Delta f$ by filtering because the frequency separation between sidebands is too small a percentage of the operating frequency for a practical filter 23 to operate upon. The filter 23 required is impractically sharp. Not only are suitably sharp filters unavailable, but it is undesirable to have a narrow band filter, because a narrow band filter will have a slow response to the transient that occurs after each relocking of the coherent oscillator. Moreover a sharp filter requires that the coherent oscillator frequency be much more accurately controlled than would be otherwise necessary.

This invention, shown in FIG. 3, pertains to a means for phase adjusting a coherent oscillator which obviates the objectionable requirement of a sharp filter. The arrangement depicted in FIG. 3 may be related to the system shown in FIG. 1 by substituting for the coherent oscillator 9 and the phase shift unit 13 in FIG. 1 the apparatus of the invention. That is, the coherent oscillator 30 replaces oscillator 9 and the output from band-pass filter 40 is fed into the receiver 7 in place of the output from the phase shift unit 13.

For ease of exposition, the invention will be described with reference to specific frequencies which are exemplary only, and it is not intended that the generality of the invention be limited by the frequencies chosen. It is assumed that the frequency $f_c$ of the coherent oscillator 30 is 30 megacycles per second. A pair of low frequency crystal oscillators 31, 32, are shown in FIG. 3 which preferably operate in the range between one and five megacycles. It is assumed that the frequency $f$ of the crystal oscillators is five megacycles. A reactance modulator 33, which may be of a well-known type, is connected to crystal oscillator 31 so that the frequency of the crystal oscillator may be frequency modulated by the output of the modulator. The modulator 33 is made responsive to a ship's speed control signal inserted at 24. The manner in which the ship's speed control signal is generated is extraneous to this invention and is not here illustrated. The means for generating such a signal are well known to the art. When the ship or other vehicle is motionless the two crystal oscillators are adjusted to have outputs which are identical in frequency. When the vehicle is in motion, the reactance modulator 33, in response to ship's speed control signals, causes the output of oscillator 31 to have a frequency $f+\Delta f$, $\Delta f$ representing the Doppler frequency due to ship's velocity. It is of critical importance that the low frequency oscillators 31, 32, be stable to such a degree that spurious variations in their frequency difference will be small compared with the Doppler frequencies to be developed. Because of the required stability, crystal controlled oscillators are best suited for this purpose at the present state of the electronic art. Insofar as the modulated crystal oscillator 31 is concerned, it is possible to shift the frequency of the crystal controlled oscillator some 50 cycles per million by adding reactance external to the crystal element. The stability of a simple crystal oscillator is of the order of 10 cycles per million and the addition of reactance tube circuitry does not alter this figure appreciably. In a common thermal environment, employing two similar crystal oscillators, the relative frequency stability of the two crystal oscillators is an order of a magnitude better, or about 1 cycle per million and adequate for the purpose of this invention.

The output $f+\Delta f$ from crystal oscillator 31 is fed into a frequency multiplier 35 which increases the frequency by a factor M, which will arbitrarily be assigned a factor of 4. The output of the multiplier 35 is therefore $M(f+\Delta f)$ and that output is fed into a mixer or heterodyning device 36 where it is heterodyned with the output $f_c$ from the coherent oscillator 30. A high pass filter 37, coupled to the output of mixer 36, permits the resultant sum frequency $f_c+M(f+\Delta f)$ to pass to a second heterodyning device or mixer 38 and suppresses the lower side band $f_c-M(f+\Delta f)$. The output $f$ of crystal oscillator 32, which in essence is a frequency datum representing zero ship's speed, is coupled into a frequency multiplier 39 which increases the frequency by an identical factor M. In the mixer 38 the output from frequency multiplier 39 is heterodyned with the output from filter 37 resulting in sum and difference frequencies equal to $$f_c+M(f+\Delta f)+M(f) \text{ and } f_c+M(f+\Delta f)-M(f)$$

It may be seen that the latter, the difference frequency $f_c+M(f+\Delta f)-M(f)$ reduces to $f_c+M(\Delta f)$ since the component $M(f)$ is cancelled by the component $-M(f)$. A band pass filter 40, connected to the output of mixer 38, permits the difference frequency $f_c+M(\Delta f)$ to pass and attenuates all frequencies lying outside the band pass range, which includes the sum frequency. The difference frequency $f_c+M(\Delta f)$ is the phase adjusted coherent oscillator output which is necessary to compensate for ship's speed. The component $M(\Delta f)$ is the Doppler frequency due to ship's velocity.

To illustrate the operation of the invention it will be assumed that the Doppler frequency due to ship's velocity is 1 kc. per second. As a consequence of this assumption, it is desired that $M(\Delta f)$ shall equal 1 kc. so that the compensated coherent oscillator output frequency $f_c+M(\Delta f)$ is 30,001 kc. In response to ship's speed control signal the reactance modulator 33 causes the output of crystal oscillator 31, which is nominally 5 mc., to be deviated by an amount $\Delta f$ equal to 250 cycles so that the output of crystal oscillator 31 is increased in frequency above its nominal value. The frequency multiplier 35 raises the output of oscillator 31 by a factor M equal to 4 so that the input to mixer 36 is a frequency of 20,001 kc. This latter frequency is heterodyned with the 30 mc. output of coherent oscillator 30 whereby there is obtained from the mixer 36 a sum frequency of 50,001 kc. and a difference frequency of 9,999 kc. Filter 37 passes the sum frequency into mixer 38 where it is heterodyned with the output from frequency multiplier 39. Crystal oscillator 32 generates an output whose frequency is 5 mc. By the action of multiplier 39, the latter output is increased by a factor of 4 resulting in a frequency of 20,000 kc. The output derived from mixer 38 contains the sum and difference frequencies of the inputs from filter 37 and multiplier 39. Since the output frequency of filter 37 is 50,001 kc. and the frequency of the output for multiplier 39 is 20,000 kc., it is readily apparent that the difference frequency is 30,001 kc. and that the sum frequency is in the vicinity of 70 mc. Band pass filter 40 may be constructed to pass frequencies in the band between 20 and 40 mc., for example, so that the difference frequency is readily passed while the sum frequency is suppressed by the filter. It is seen, therefore, that the coherent oscillator output obtained from filter 40 is compensated for ship's speed. From the foregoing description of the operation of the invention, it is seen that the requirement for sharp filters has been obviated by spreading the frequency separation between side bands to such an extent that practical filters may be used.

While a preferred embodiment of the invention has been illustrated, it is intended that the invention not be limited by the specific arrangement depicted but rather that the scope of the invention be construed in accordance with the appended claims since modifications of the invention may be made without departing from the essence of the invention. For example, the crystal controlled oscillators 31 and 32 may be replaced by other types of very stable oscillators. As another example, the frequency multipliers 35 and 39 may be eliminated if extremely stable high frequency oscillators are substituted in place of the low frequency crystal oscillators 31 and 32.

What is claimed is:

1. In a moving target indicating system having a coherent oscillator, the improvement comprising a first stable oscillator, means for frequency modulating said first oscillator, a first heterodyning device, the outputs of said first oscillator and said coherent oscillator being coupled to said first heterodyning device, a first filter connected to the output of said first device for passing the resultant sum frequency signals to a second heterodyning device, a second stable oscillator having its output coupled to said second device, and a second filter connected to the output of said second device for passing the resultant difference frequency signals.

2. In a moving target indicating system having a coherent oscillator, the improvement comprising first and second stable oscillators, means for frequency modulating said first oscillator, a first heterodyning device, means coupling the outputs of said first oscillator and said coherent oscillator to said first device, a second heterodyning device, a first filter connected between said heterodyning devices for passing the resultant sum frequency signals from said first device to said second device, means coupling the output of said second oscillator to said second device, and a second filter coupled to the output of said second heterodyning device for passing the resultant difference frequency signals.

3. In a moving target indicating system having a coherent oscillator, the improvement of apparatus for compensating said system for the motion of a vehicle on which said system is mounted comprising a first stable oscillator having an output at a first frequency, means connected to said first oscillator for frequency modulating said first oscillator in response to control signals indicating vehicle speed, a first heterodyning device connected to the output of said coherent oscillator, a first frequency multiplier connected between said first oscillator and said first device, said first multiplier increasing the output of said first oscillator at the first frequency into a higher frequency output than the output at said first frequency, a second stable low frequency oscillator having its output connected to a second frequency multiplier, said second multiplier increasing the frequency output of said second oscillator to an output at a higher frequency, a second heterodyning device having its input coupled to the output of said first device and to the output of said second multiplier, and a band pass filter coupled to the output of said second device for passing the resultant difference frequency signals.

4. In a moving target indicating system having a coherent oscillator, the improvement of apparatus for compensating said system for the motion of a vehicle on which said system is mounted comprising first and second stable low frequency oscillators having outputs of the same frequency when said vehicle is motionless, means for frequency modulating said first oscillator in accordance with control signals representing vehicle speed, frequency multipliers coupled to the outputs of said first and second oscillators, a first mixer, the frequency multiplied signals derived from said first oscillator and the output of said coherent oscillator being coupled into said first mixer, a first filter coupled between the output of said first mixer and a second mixer for passing the resultant sum frequency signals to said second mixer, the frequency multiplied signals derived from said second oscillator being coupled to said second mixer, and a second filter coupled to the output of said second mixer for passing the resultant difference frequency signals.

5. In a moving target indicating system having a coherent oscillator, the improvement of apparatus for compensating said system for the motion of a vehicle on which said system is mounted comprising a first low frequency crystal controlled oscillator, a reactance modulator coupled to said first oscillator, a first frequency multiplier having its input connected to said first oscillator and its output coupled into a first mixer, said coherent oscillator having its output coupled into said first mixer, a second low frequency crystal controlled oscillator having its output coupled into a second frequency multiplier, a second mixer coupled to the output of said second frequency multiplier, a filter coupled between the output of said first mixer and said second mixer for passing the upper side band output of said first mixer to said second mixer, and a band pass filter coupled to the output of said second mixer for passing the lower side band output of said second mixer.

6. In combination, means for producing a signal, a first frequency source, means for changing the frequency of of said first frequency source according to said signal, a source of phase information, a second frequency source, means for changing the phase of said second frequency source according to said phase information, means for combining the output frequencies of said first and second frequency sources to provide a set of sideband frequencies, a fixed third frequency source, and means for combining the output of said third frequency source with a single frequency of said first set of sidebands to provide a second set of sideband frequencies, and means for selecting a single frequency from said second set of sideband frequencies.

References Cited in the file of this patent

UNITED STATES PATENTS 2,518,864    Carlson               Aug. 15, 1950
2,769,158    Schultz               Oct. 30, 1956